(12) United States Patent
Chen et al.

(10) Patent No.: US 10,116,713 B2
(45) Date of Patent: Oct. 30, 2018

(54) SYSTEM AND METHODS FOR CONTENT STREAMING WITH A CONTENT BUFFER

(71) Applicants: Jamdeo Canada Ltd., Oakville (CA); Qingdao Hisense Electronics Co., Ltd., Qingdao, Shandong (CN); Hisense USA Corp., Suwanee, GA (US); Hisense International Co., Ltd., Qingdao, P.R.C. (CN)

(72) Inventors: Tong Chen, Markham (CA); Mikhail Shoykher, Burlington (CA)

(73) Assignees: JAMDEO CANADA, LTD., Ontario (CA); QINGDAO HISENSE ELECTRONICS CO., LTD., Qingdao (CN); HISENSE USA CORP., Suwanee, GA (US); HISENSE INTERNATIONAL CO., LTD., Qingdao (CN)

(*) Notice: Subject to any disclaimer, the term of this patent is extended or adjusted under 35 U.S.C. 154(b) by 191 days.

(21) Appl. No.: 15/087,460

(22) Filed: Mar. 31, 2016

(65) Prior Publication Data

US 2017/0289213 A1   Oct. 5, 2017

(51) Int. Cl.
*G06F 15/16* (2006.01)
*H04L 29/06* (2006.01)
(Continued)

(52) U.S. Cl.
CPC ...... *H04L 65/4069* (2013.01); *H04L 47/6295* (2013.01); *H04L 47/724* (2013.01)

(58) Field of Classification Search
CPC ............. H04L 65/4069; H04L 47/6295; H04L 47/724; H04L 29/06; H04L 12/863; H04L 12/913
See application file for complete search history.

(56) References Cited

U.S. PATENT DOCUMENTS 7,975,025 B1 * 7/2011 Szabo ............... G06F 17/30902 709/203
9,454,506 B2 * 9/2016 Ho ..................... G06F 17/30902
(Continued)

FOREIGN PATENT DOCUMENTS

CN   103024045   4/2013
CN   103870470   6/2014

OTHER PUBLICATIONS

International Search Report PCT/CN/2017/07914, May 27, 2017, Intellectual Property Office of the P.R. China (ISA/CN).

*Primary Examiner* — Cheikh Ndiaye
(74) *Attorney, Agent, or Firm* — Gordon & Rees LLP (57) ABSTRACT

The present disclosure relates to systems, methods, electronic devices and applications for content streaming with an intermediate content buffer. In one embodiment, a method includes detecting, by a content buffer, a request for network content from a player, wherein the request is a network communication detected by the content buffer and the request for network content is directed to a server and identifying, by the content buffer, associated network content, wherein the associated network content is associated with the network content requested by the player. The method may also include pre-downloading associated network content for the player based on the identifying, wherein the content buffer requests associated network content from the server, and providing the associated network content to the player. Another embodiment is directed to a device configured to run a content buffer and provide content for a content player.

20 Claims, 7 Drawing Sheets

(51) Int. Cl.
*H04L 12/913* (2013.01)
*H04L 12/863* (2013.01)

(56) References Cited

U.S. PATENT DOCUMENTS

| | | |
|---|---|---|
| 9,692,800 B2 * | 6/2017 | Gaunt ................. H04L 65/4084 |
| 2013/0238746 A1 * | 9/2013 | Parandehgheibi ........................... H04L 29/08081 709/217 |
| 2014/0237026 A1 | 8/2014 | Tang |
| 2014/0244727 A1 * | 8/2014 | Kang ................. H04L 65/1069 709/203 |
| 2015/0026288 A1 | 1/2015 | Kim et al. |
| 2016/0173639 A1 | 6/2016 | Tuliani et al. |
| 2016/0191664 A1 * | 6/2016 | Balakrishnan .......... H04L 67/26 709/203 |

* cited by examiner

SYSTEM AND METHODS FOR CONTENT STREAMING WITH A CONTENT BUFFER

FIELD

The present disclosure relates to transmission of electronic data over a data communication network, and more particularly to systems, methods and devices configured for content streaming with a content buffer.

BACKGROUND

Streaming of electronic data is a common form of sharing content over computer networks. In addition to standard network communications protocols for transmission and exchange of data over networks, network applications typically operate with a particular set of protocols for presenting streamed content. In many instances, conventional network applications may be affected by transient network issues. As a result, users of content streaming can experience interruptions for a period of time during streaming. These interruptions can affect the use of streaming until a data stream can be restored. Content interruptions can affect many different types of content players. There exists a need to overcome content disruptions such as playback interruption. In many cases, conventional communication protocols and configurations will experience playback interruption due to the configuration of existing devices.

BRIEF SUMMARY OF THE EMBODIMENTS

Disclosed and claimed herein are systems, methods and devices for content streaming with an intermediate content buffer. One embodiment is directed to a method including detecting, by a content buffer, a request for network content from a player, wherein the request is a network communication detected by the content buffer and the request for network content is directed to a server, and identifying, by the content buffer, associated network content, wherein the associated network content is associated with the network content requested by the player. The method also includes pre-downloading, by the content buffer, associated network content for the player based on the identifying, wherein the content buffer requests associated network content from the server, and providing, by the content buffer, the associated network content to the player based on the pre-downloading.

In one embodiment, detecting a request for network content from the player includes intercepting network communications for streaming content generated by the based on one or more of file type and file naming.

In one embodiment, the content buffer detects requests by intercepting communications relative to a shared network communication link.

In one embodiment, the content buffer detects requests based by intercepting communications relative to an input/output interface of a device executing the player.

In one embodiment, identifying includes associating the request with a pattern based on one or more of previous requests, file name extensions and identification of a playlist.

In one embodiment, identifying includes determining a byte range for content based on byte range identification in the request.

In one embodiment, pre-downloading includes requesting the associated content by the content buffer prior to the content buffer detecting a request for the associated content from the player.

In one embodiment, providing associated content by the content buffer includes providing the associated content following a request by the player for associated content and based on associated content stored by the content buffer.

In one embodiment, the method also includes clearing stored segments of content by the content buffer following distribution to the player.

In one embodiment, the method also includes creating a playlist by the content buffer based on the request, requesting content from the server based on the playlist and assembling requested content from the server for distribution to the player based on the playlist Another embodiment is directed to a device including memory and a controller coupled to the memory. The controller is configured to present a content player and run a content buffer to detect a request for network content from a player, wherein the request is a network communication detected by the content buffer and the request for network content is directed to a server, and identify associated network content, wherein the associated network content is associated with the network content requested by the player. The controller is also configured to pre-download associated network content for the player based on the identifying, wherein the content buffer requests associated network content from the server, and provide the associated network content to the player.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to improving streaming of content and presentation of content. Content from a website, server, and/or network application address may be streamed utilizing network protocols and a content buffer to accelerate delivery and/or prevent interruption. In one embodiment, content can be associated with a particular media title (movie, show, video, etc.). Content buffer can overcome limitations in protocols which limit the number of sessions between a player and server. Thus, instead of fetching content files one at a time, a content buffer can open multiple sessions at the same time to increase buffer.

A system, methods and device configurations are provided for streaming content with a content buffer. In one embodiment, content buffer is inserted between a player and content server to detect and analyze traffic relative to the player and server. The content buffer can request content from the server and provide content to the player. In that fashion the content buffer may act as a transparent entity that does not require any modifications to the player, or server, and improve content streaming. In one embodiment, content streaming may be improved by performing a process of detection, identification of content, pre-downloading and providing content to a player. According to another embodiment, a playlist is created for providing content to a player.

In one embodiment, the content buffer is configured to operate with network streaming protocols (e.g., HLS, HTTP, etc.) and one or more player plug-in/video formats. According to another embodiment, the content buffer operates based on byte serving to dynamically split content and request content from a server in segments based on the splitting.

As used herein, content relates to information provided by a data communication network. Streamed content can include, but is not limited to, image data, sound data, video data, video streams, audio streams, multimedia content and media content in general.

A content buffer is associated with functional abilities and structural components of a device. In certain embodiments, a content buffer is a device configured for network communication. In other embodiments, a content buffer is incorporated into a device, such as a computing device, for presentation of content. Content buffers may be configured to serve multiple players.

A player refers to application and control features of a device that allow for presentation of content, and transmission of requests for content. A player is configured to decode received content and to present the content, such as output of video, image and/or audio content to a device for presentation.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1A:
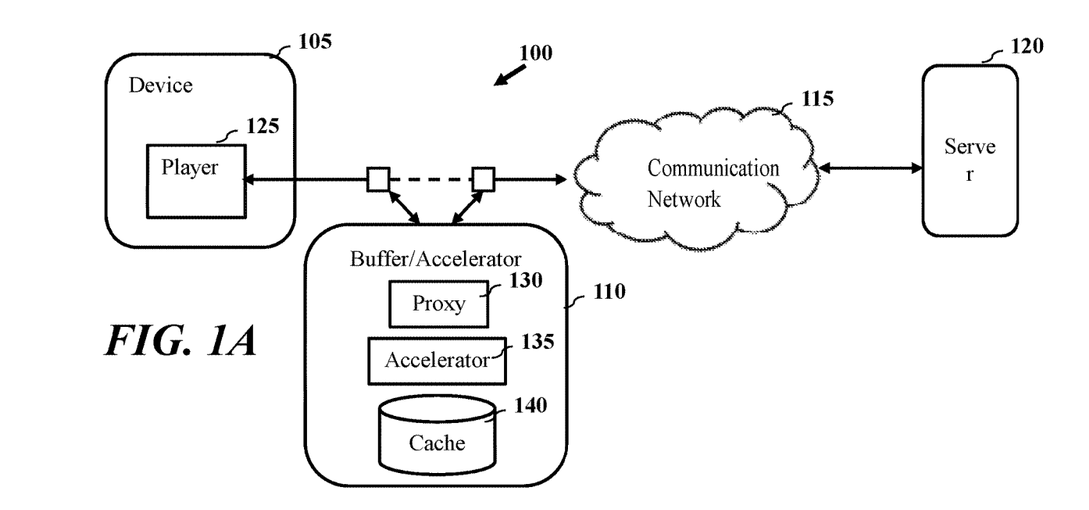
FIG. 1A depicts a graphical representation of a simplified system diagram according to one or more embodiments.

Referring now to the figures, FIG. 1A depicts a graphical representation of a simplified system diagram according to one or more embodiments. According to one embodiment, a content buffer is provided for content streaming associated with a player. System 100 includes device 105, content buffer 110, communication network 115 and server 120. According to one or more embodiments, content buffer 110 may be configured to improve the quality of content streams provided to player 125.

In one embodiment, device 105 relates to a computing device configured to communicate over a data communication network, such as communication network 115. In one embodiment, device 105 is a media player. Device 105 may include a display and/or output for presentation of content associated with player 125. According to one embodiment, player 125 may be configured to present streamed content. Player 125 may relate to an application or add-in functionality to stream content, such as streamed video content, provided by a server 120. In one embodiment, server 120 is a content server configured to transmit content over communication network 115 to device 105 and player 125. According to one embodiment, one or more communication protocols can be utilized for communication relative to player 125 and server 120. Player 125 is configured to request content from server 120, such as one or more of video content, multimedia, and network content in general.

Content buffer 110 may be configured for one or more functions to improve and/or accelerate streaming of content to player 125. According to one embodiment, content buffer 110 may be configured to detect traffic between player 125 and server 120. According to another embodiment, content buffer 110 is configured to identify content associated with requested content, pre-downloading associated content and provide the pre-downloaded content to the player. In that fashion, streaming of content to player 125 may be improved by lessening the probability of playback interruption.

According to one embodiment, content buffer 110 is configured to provide a content acceleration service, such as video acceleration to improve the quality of streaming video playback (e.g., HTTP stream, network streams, etc.). By way of example, content buffer 110 may be an intermediary buffer that is configured to perform parallel or concurrent downloads of content. Content buffer 110 can protect player 125 from buffer underruns (e.g., not receiving content in time to present without interruption) in the case of transient network issues. Avoiding buffer underruns can lessen the probability of playback interruption. By providing parallel downloads, content buffer 110 can improve available bandwidth for player 125. According to one embodiment, content buffer 110 allows for content to be provided to player 125 without having player 125 or server 120 to be modified.

Content buffer 110 is depicted in FIG. 1 as including proxy module 130, accelerator module 135 and cache module 140. Proxy module 130, accelerator module 135 and cache module 140, represented functions performed by content buffer 110. According to one embodiment, proxy module 130 and accelerator module 135 are functional capabilities performed by and/or directed by a controller of content buffer 110. Proxy module 130 is configured to detect and/or intercept traffic from player 125 to server 120 associated with requests for content, such as streaming of content, particular files, particular data ranges and/or playlists. According to another embodiment, proxy module 130 is configured to act as a proxy server for providing content to player 125. Accelerator module 135 is configured to determine content associated with requests by player 125, pre-download content and provide pre-downloaded content to player 125. Cache 140 is configured to store pre-downloaded content by content buffer 110.

According to one embodiment, communication network 115 may be configured to allow for wired and wireless communication. Server 120 relates to a content server and may be a media server. In certain embodiments, player 125 and/or content buffer 110 may communicate with one or more additional servers by way of communication network 115.

Figure 1B:
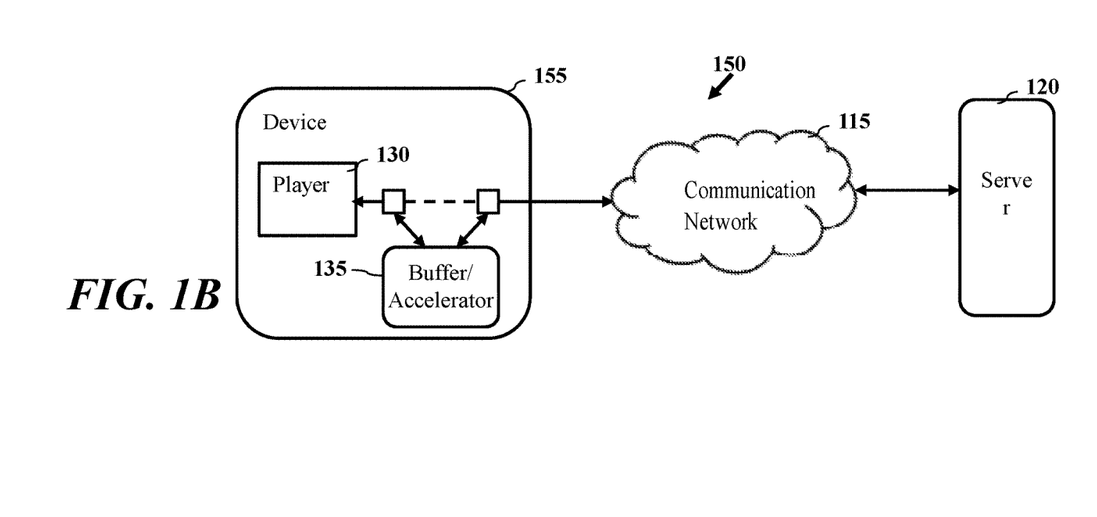
FIG. 1B depicts a graphical representation of a simplified system diagram according to one or more other embodiments.

FIG. 1B depicts a graphical representation of a simplified system diagram according to one or more other embodiments. According to one embodiment, a device is configured to include a content buffer. FIG. 1B depicts system 150 including device 155, communication network 115, and server 120.

According to one embodiment, device 155 includes player 130 configured to request and provide streamed content and content buffer 135. Content buffer 135 is configured to detect requests for stream content within device 155.

Figure 2:
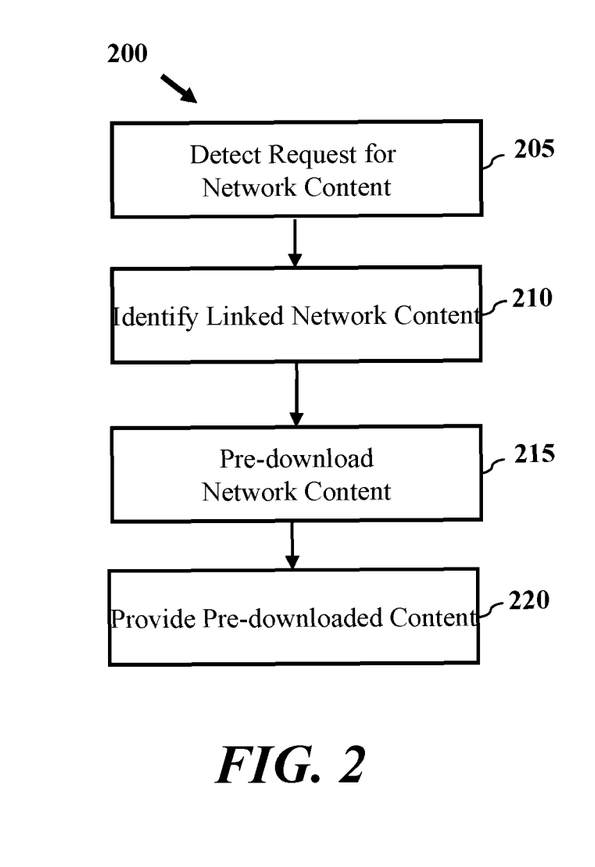
FIG. 2 depicts a process for content streaming with an intermediate content buffer according to one or more embodiments.

FIG. 2 depicts a process for content streaming with an intermediate content buffer according to one or more embodiments. According to one embodiment, process 200 is executed by a content buffer (e.g., content buffer 110, content buffer 135, etc.) to provide content to a player and/or device. Process 200 includes a content buffer detecting a request for network content at block 205. The content buffer may intercept requests by the player to improve streaming of content to the player. The content player can detect requests based on the type of content, communication protocol, request history, type of player, etc. Detecting of requests for network content from the player can include intercepting the network communications such that the content buffer handles requests with a server or detection of the requests. In one embodiment, detection of requests for streaming content generated is based on one or more of file type and file naming. These requests may be detected by the content buffer intercepting communications relative to a shared network communication link. In other embodiments, the content buffer can detect requests based by intercepting communications relative to an input/output interface of a device executing the player. According to one embodiment, detection of a request at block 205 is directed to determining a pattern of requests and can include detection of one or more requests for content.

At block 210, the content buffer identifies linked network content. Identification by the content buffer can determine associated network content, such as different segments of a content file, different media associated with a particular playlist, etc. Associated content may be from one or more servers. In certain embodiments, the associated network content is associated with the network content requested by the player. Identification by the content buffer can include associating the request with a pattern based on one or more of previous requests, file name extensions and identification of a playlist. Identification can include determining a byte range for content based on byte range identification in the request. Identification can include determining content metadata to identify length of the content, number of content segments, and/or content sources. Based on a possible downloading/request pattern determined by the content buffer, identification at block 210 can include selection of a possible stream of content that the player will request. In some embodiments, multiple streams of content may be identified. In other embodiments, a selection of content from a playlist and pattern of selecting content according to the listing order of the playlist can signal the next request to be made.

At block 215, the content buffer pre-downloads network content. According to one embodiment, pre-downloading associated network content for the player at block 215 is based on identification of associated content and the likelihood that content will be requested. The content buffer requests associated network content from the server during the pre-downloading. Pre-downloading can include requesting the associated content by the content buffer prior to the content buffer detecting a request for the associated content from the player. Pre-downloading at block 215 can shortcut the process of requesting content from a server only in response to a request. By pre-downloading, the content buffer can check to determine whether content has been preloaded and return data immediately to the player. In addition, the content buffer can download other content (e.g., background downloading) while providing pre-downloaded content to the player.

At block 220, the content buffer provides pre-downloaded content to the player, such that associated network content is provided to the player based on the pre-downloading. Providing associated content by the content buffer includes providing the associated content following a request by the player for associated content and based on associated content stored by the content buffer.

Process 200 may also include clearing stored segments of content by the content buffer following distribution to the player.

In one embodiment, process 200 also includes creating a playlist by the content buffer based on the request, requesting content from the server based on the playlist and assembling requested content from the server for distribution to the player based on the playlist.

Figure 3:
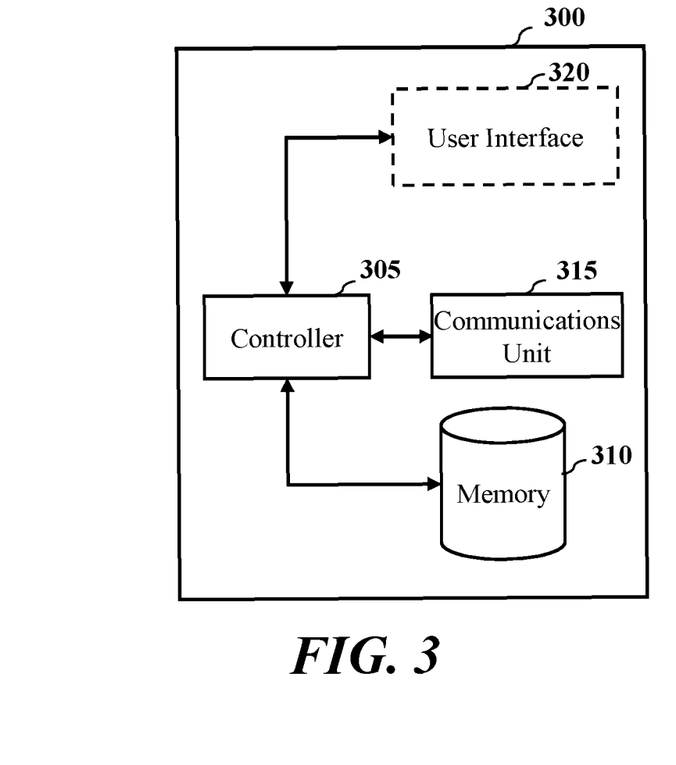
FIG. 3 depicts a simplified diagram of a device according to one or more embodiments.

FIG. 3 depicts a simplified diagram of a device according to one or more embodiments. Device 300 may relate to one or more devices for executing a content buffer. In certain embodiments, device 300 is a standalone device dedicated to content buffering for one or more other devices. In other embodiments, device 300 is a computing device (e.g., computer, media player, set-top box, etc.) configured to execute a player and content buffer.

As shown in FIG. 3, device 300 includes controller 305, memory 310, communications unit 315 and optional user interface 320. Controller 305 may be configured to execute code stored in memory 310 for operation of device 300 including providing a content buffer. According to one embodiment, controller 305 includes a processor and/or one or more processing elements. In one embodiment, controller 305 includes one or more of hardware, software, firmware and/or processing components in general. According to one embodiment, controller 305 is configured to perform one or more processes described herein. Communications unit 315 is configured for wired and/or wireless communication with one or more network elements, such as servers. Memory 310 can include non-transitory RAM and/or ROM memory for storing executable instructions, operating instructions and content for display. Optional user interface 320 can include one or more input/output interfaces for control and/or communication. In certain embodiments, device 300 relates to a device including a display as part of optional user interface 320, such as a TV, mobile device, or device having a display in general. According to another embodiment, device 300 is a device, such as a set-top box, configured to output content to a display device.

Figure 4:
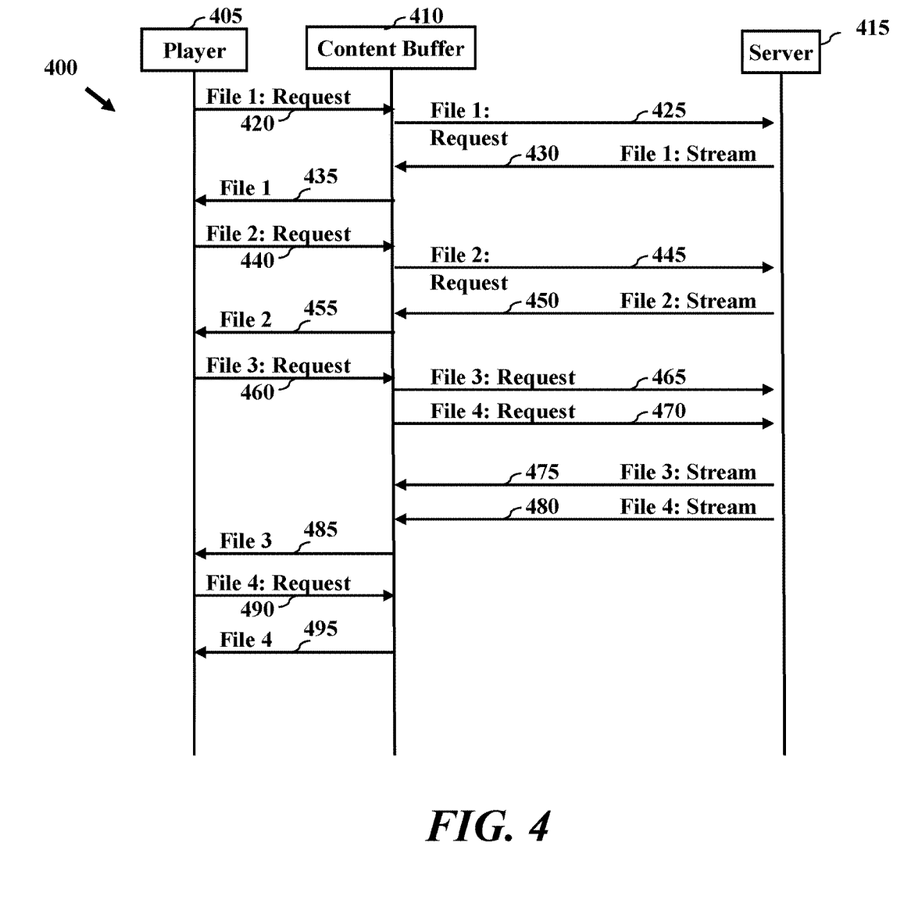
FIG. 4 depicts a graphical representation of content buffer interaction with a player and server according to one or more embodiments.

FIG. 4 depicts a graphical representation of content buffer interaction with a player and server according to one or more embodiments. Sequence 400 depicts exemplary content requests by a player 405 and exemplary operation of a content buffer 410 according to one or more embodiments. Player 405 and content buffer 410 may relate to embodiments of player and content buffer of FIGS. 1A-1B. In one embodiment, player 405 and content buffer 410 are devices. In another embodiment, player 405 and content buffer 410 represent functional capabilities of one or more components of devices. Sequence 400 is presented with reference to server 415, which can relate to a web server, content server or server in general. According to one embodiment, server 415 includes and/or can provide content by way of a communications network to player 405.

Sequence 400 depicts transmission of requests by player 405 for content and pre-downloading of content by content buffer 410. According to one embodiment, content buffer 410 identifies content to pre-download based on requests generated by player 405. Sequence 400 includes transmission of a file request 420 (e.g., File 1: Request) by player 405. According to one embodiment, requests for content by player 405 are detected by content buffer 410. According to another embodiment, content buffer 410 is configured to act as a proxy to server 415. Based on content buffer 410 detecting file request 420, the request is forwarded to server 415 as file request 425 (e.g., File 1: Request). In response, server 415 provides the requested content 430 (e.g., File 1: Stream) to content buffer 410 which is then provided to player 405 shown as content 435 (e.g., File 1).

Similar to file request 420, sequence 400 includes transmission of a file request 440 (e.g., File 2: Request) by player 405, detection by content buffer 410 of file request 440, and forwarding of request 440 to server 415 as file request 445 (e.g., File 2: Request). In response, server 415 provides the requested content 450 (e.g., File 2: Stream) to content buffer 410 which is then provided to player 405 shown as content 455 (e.g., File 2). According to one embodiment, content buffer 410 employs file request 420 and file request 440 to identify content that is likely to be requested by player 405. Identification by content buffer 410 may be based on one or more requests.

Sequence 400 includes transmission of a file request 460 (e.g., File 3: Request) by player 405, and detection by content buffer 410 of file request 460. According to one embodiment, content buffer 410 forwards request 460 to server 415 as file request 465 (e.g., File 3: Request) and content buffer 410 determines if there are additional files to request. Based on a determination of an additional file, content buffer 410 sends file request 470 (e.g., File 4: Request) to server 415. In one embodiment, transmission of file request 470 occurs following the transmission of request 460. In certain embodiments, content buffer 410 identifies content associated with requests by player 405 prior to player 405 requesting the content, such as content associated with request 470. In response to file requests 460 and 470, server 415 provides the requested content 475 (e.g., File 3: Stream) and content 480 (e.g., File 4: Stream) to content buffer 410. Content buffer 410 provides content 485 (e.g., File 3) associated with request 460 and content 475 to player 405. As shown in FIG. 4, content buffer 410 retains content 480 (e.g., File 4) associated with request 470 until a request by player 405 is detected. In that fashion, content buffer can provide pre-download content 480. Sequence 400 also includes transmission of a file request 490 (e.g., File 4: Request) by player 405, and transmission of content 495 by content buffer 410 to player 405 based on content 480 previously downloaded.

As shown in FIG. 4, content buffer 410 pre-downloads content (e.g., File 4) associated with request 470 prior to player 405 requesting the content (e.g., File 4). According to one embodiment, content buffer 410 may perform multiple pre-downloads, such that multiple file requests are transmitted to server 415 without a corresponding request by player 405. Segments of the requests by content buffer 410 associated with pre-downloading may be based on a link to one or more previous requests.

Figure 5:
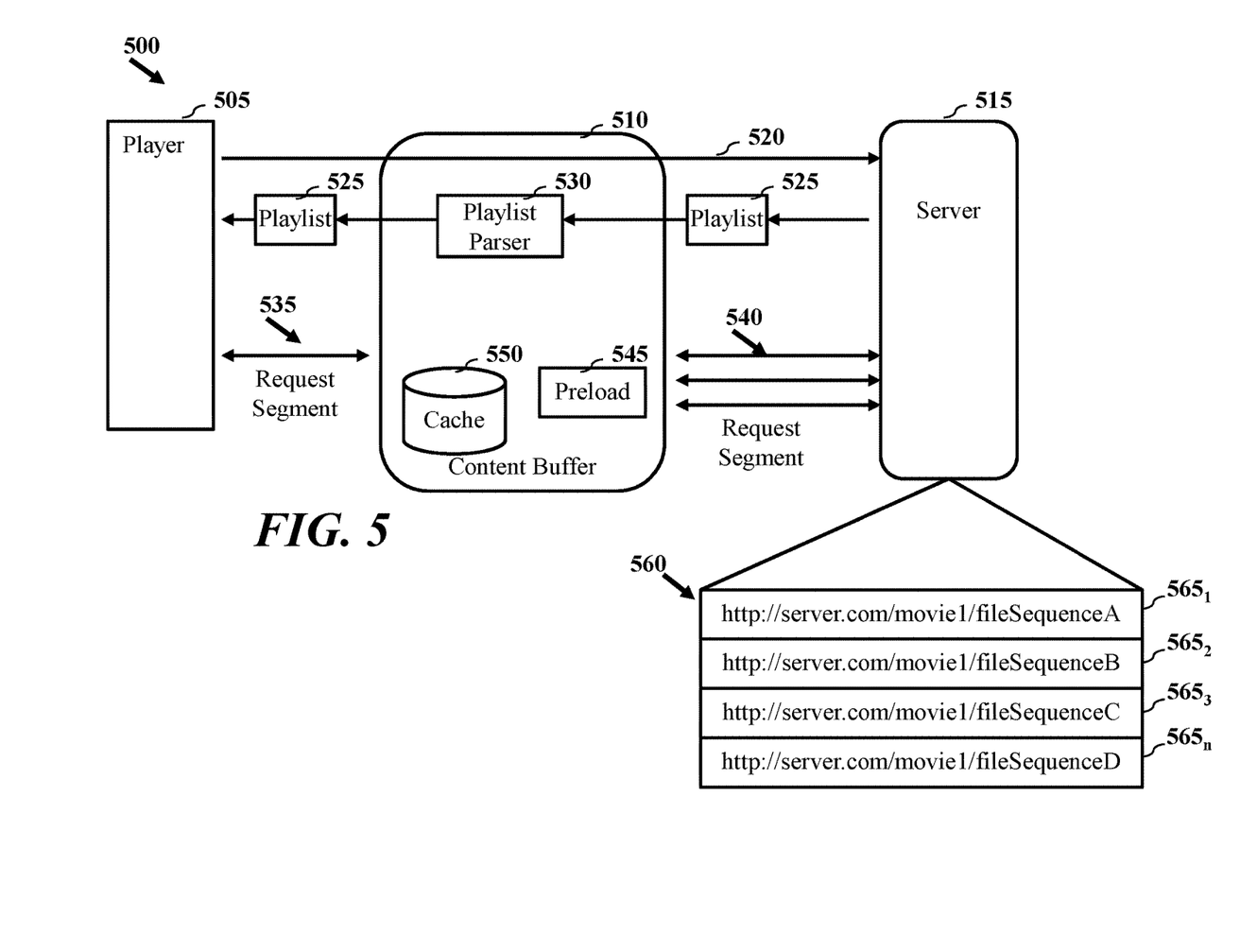
FIG. 5 depicts a graphical representation of buffer operation according to one or more embodiments.

FIG. 5 depicts a graphical representation of buffer operation according to one or more embodiments. According to one embodiment, a content buffer as described herein is configured to detect and analyze playlist requests. System 500 depicts player 500, content buffer 510 and server 515. According to one embodiment, a request playlist 520 issued by player 505 is detected by content buffer 510 and transmitted to server 515. In certain embodiments, content buffer is configured to act as a proxy for server 515. Server 515 can transmit playlist 525 based on playlist request 520 to content buffer 510. A playlist parser 530 of content buffer 510 receives playlist 525 and provides playlist 525 to player 505. Player 505 may utilize the playlist to present a user interface and/or identify content associated with playlist 525. Playlist parse 530 may be configured to analyze the playlist for content. In response to requests for segments or content associated with playlist 525 from player 505, content buffer 510 may fetch content from server 515 as shown by segments 540. One or more segments may be preloaded, preload module 545, of content buffer 510 and stored in cache 550.

FIG. 5 provides an exemplary representation of content 560 associated with playlist 525. According to one embodiment, content 560 includes a plurality of files $565_{1-n}$. Files of content 560 may be linked by the playlist, be sections of a media files (e.g., video, movie, program, etc.), or other forms of content identified by the playlist 525. According to one embodiment, files $565_{1-n}$ relate to multiple segments for partitioning content, wherein the segments are partitioned based on time or data. According to one embodiment, files $565_{1-n}$ are associated with a particular content title (e.g., media title, etc.).

When player starts fetching a sequence (e.g., sequence A), content buffer 510 predicts a sequence (e.g., sequence B) will be needed soon and will start downloading the identified segment from the background. Later when content buffer 510 receives a request for the pre-downloaded sequence (e.g., sequence B), the buffer may have some or all of the sequence to provide to the player immediately.

Content buffer 505 may be configured for one or more functions to improve and/or accelerate streaming of content to player 525. According to one embodiment, content buffer 505 may be configured to detect traffic between player 525 and server 520.

Figure 6:
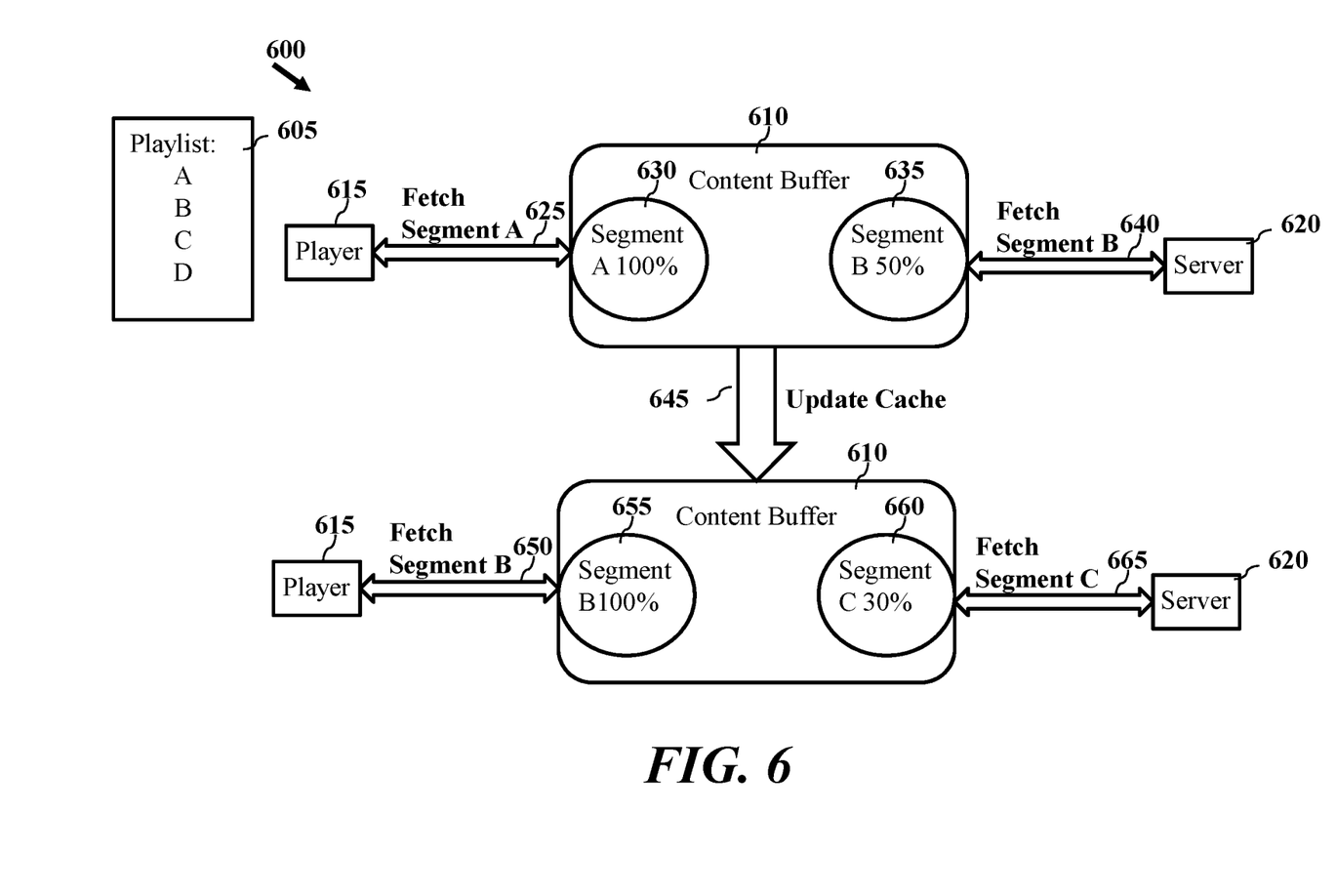
FIG. 6 depicts a graphical representation of buffer operation according to one or more embodiments.

FIG. 6 depicts a graphical representation of buffer operation according to one or more embodiments. According to one embodiment, a content buffer is configured to determine when pre-downloaded content is no longer needed and to provide cache clearing. System 600 depicts playlist 605 and content buffer 610. According to one embodiment, content buffer 610 is configured to detect traffic between player 615 and server 620 and update data within content buffer 610 according to requests from player 615. By caching data, content buffer 610 can maintain a relatively small cache which ensuring that player 615 is provided data without interruption.

According to one embodiment, content buffer 610 includes cache (e.g., memory) to store content, such as segments of streaming data. Player 615 requests segment 635 (e.g., segment A) content buffer which is stored as content 630 and provided to player 615. Content buffer 610 may simultaneously store content 635 (e.g., Segment B) which pre-downloading content 640 from server 620. One or more segments may be preloaded, preload module 545, of content buffer 510 and stored in cache 550. Based on data provided to player 615 and one or more request from player 615, content buffer 610 updates cache memory of the buffer by removing data from the content buffer at 645. Thus, in response for an updated segment request from player 615, shown as request 650, content buffer 655 associated with content 635 stores content 660 based on a request 665 with server 620.

Figure 7:
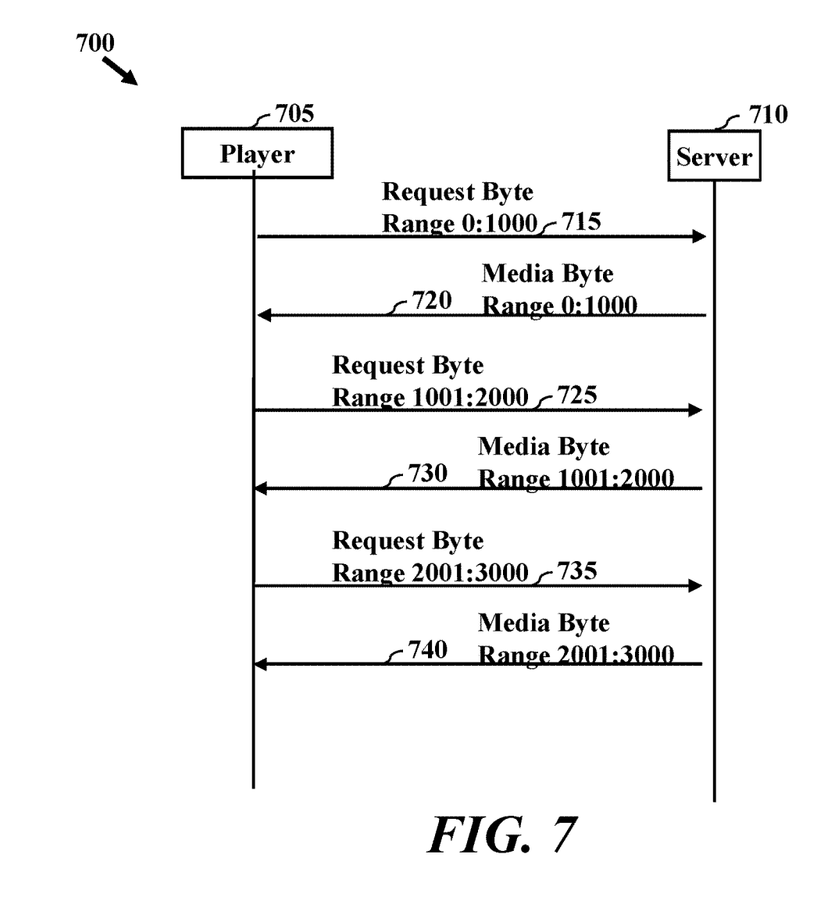
FIG. 7 depicts a graphical representation of byte range intervals according to one or more embodiments.

FIG. 7 depicts a graphical representation of byte range intervals according to one or more embodiments. According to one embodiment, a content buffer as described herein is configured to provide content based on streaming protocol which operates on content separated into particular data ranges. FIG. 7 depicts an exemplary sequence for streaming content. Sequence 700 depicts player 705 requesting data from server 710 based on one or more pre-set data ranges. Request 715, for example, may relate to data from 1 to 1000 bytes of data associated with a content file. Server 710 may respond with media 720 associated with the range of data identified in request 715. In a similar fashion, server 710 may respond to additional inquiries from player 705. In response to request 725 for data from 1001 to 2000 bytes of data associated with a content file, server 710 may respond with media 730. In response to request 735 for data from 2001 to 3000 bytes of data associated with a content file, server 710 may respond with media 735.

Figure 8:
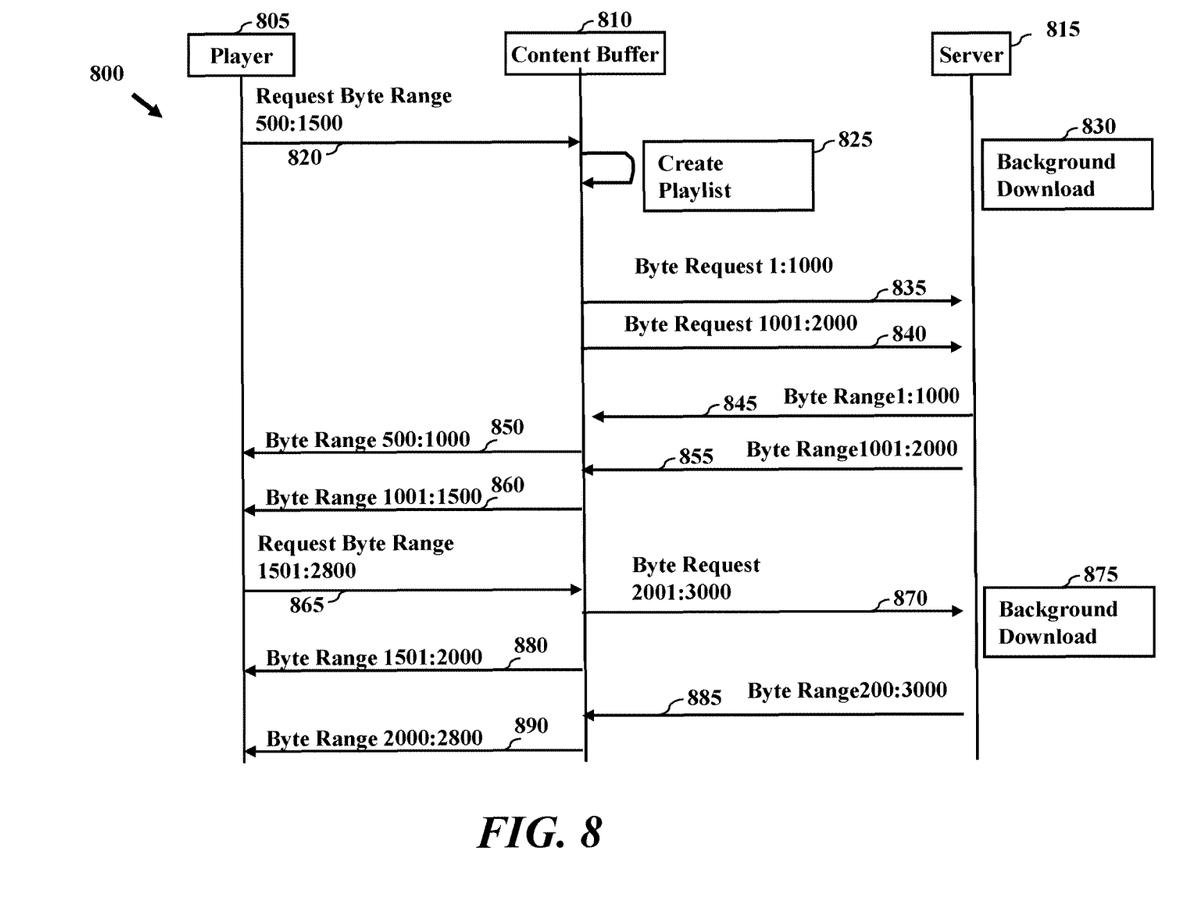
FIG. 8 depicts a graphical representation of content buffer interaction with a player and server according to one or more embodiments.

FIG. 8 depicts a graphical representation of content buffer interaction with a player and server according to one or more embodiments. Sequence 800 depicts exemplary content requests by a player 805 and operation of a content buffer 810 according to one or more embodiments. Player 805 and content buffer 810 may relate to embodiments of player and content buffer of FIGS. 1A-1B. In one embodiment, player 805 and content buffer 810 are devices. In another embodiment, player 805 and content buffer 810 represent functional capabilities of one or more components of devices. Sequence 800 is presented with reference to server 815, which can relate to a web server, content server or server in general. According to one embodiment, server 815 includes and/or can provide content by way of a communications network to player 805.

Sequence 800 depicts transmission of a request 820 by player 805 for content including a data range (e.g., byte range 500-1500). According to one embodiment, content buffer 810 detects request 820 and creates playlist at block 825. Content buffer can perform background downloading at block 830 and 875 to pre-download one or more byte/data sequences during sequence 800. Background downloading as shown in FIG. 8 may be based on data requested, data pre-downloaded/cached and/or playlist 825.

According to one embodiment, sequence 800 relates to a byte servicing protocol, wherein the content file is not split into segments statically. As such, player 805 can request arbitrary pieces of the content specifying the byte range (e.g., first and last byte). To enable acceleration, content buffer 810 creates playlist 825 and virtual segments, both of which are hidden from the server 815 and player 805. In that fashion, when content is requested, content buffer 810 pre-downloads virtual segments using byte range requests and caches content associated with each byte range request. The content buffer 810 assembles segments into content before providing the content to player 805.

Based on playlist created at block 825, content buffer 810 requests content from server 815. In one embodiment, request by content buffer 810 include one or more requests for content segments, such as request 835 for byte range 1:1000 and request 840 for byte range 1001-2000. According to one embodiment, content server 810 requests multiple requests in order to transmit content segments which include data associated with request 820. In response to request 835, server 815 transmits content segment 845. Content buffer 810 provides content segment 845 to player 805 shown as content 850. Similarly, in response to request 840, server 815 transmits content segment 850. Content buffer 810 provides content segment 855 to player 805 shown as content 860. In that fashion, player 805 receives content as if request 820 was sent to server 815.

Content buffer 810 can use the playlist created at block 825 to server multiple requests from the player 805. In response to request 865 for content associated with a particular data range content buffer 810 can issue request 870 for content from server 815 and immediately return content 880 which is associated with a portion of the content already downloaded. In response to request 870, server 815 transmits content segment 885. Content buffer 810 provides content segment 885 to player 805 shown as content 890.

While this disclosure has been particularly shown and described with references to exemplary embodiments thereof, it will be understood by those skilled in the art that various changes in form and details may be made therein without departing from the scope of the claimed embodiments.

What is claimed is:

1. A method for content streaming with an intermediate content buffer, the method comprising:
    detecting, by a content buffer of a device, a request for network content from a player, wherein the request is a network communication detected by the content buffer and the request for network content is directed to a server, wherein the request includes a data range;
    creating, by the content buffer of the device, a playlist and virtual segments for the network content in response to the request;
    requesting, by the content buffer, a first virtual segment of the playlist for the network content from the server based on the data range;
    identifying, by the content buffer of the device, associated network content, wherein the associated network content is associated with the network content requested by the player;
    pre-downloading, by the content buffer of the device, associated network content for the player based on the identifying, wherein the content buffer requests associated network content from the server based on a second virtual segment of the playlist for the associated network content;
    and
    providing, by the content buffer of the device, the associated network content to the player based on the pre-downloading.

2. The method of claim 1, wherein detecting a request for network content from the player includes intercepting network communications for streaming content generated by the server based on one or more of file type and file naming.

3. The method of claim 1, wherein the content buffer detects requests by intercepting communications relative to a shared network communication link.

4. The method of claim 1, wherein the content buffer detects requests based by intercepting communications relative to an input/output interface of a device executing the player.

5. The method of claim 1, wherein identifying includes associating the request with a pattern based on one or more of previous requests, file name extensions and identification of a playlist.

6. The method of claim 1, wherein identifying includes determining a byte range for content based on byte range identification in the request.

7. The method of claim 1, wherein pre-downloading includes requesting the associated content by the content buffer prior to the content buffer detecting a request for the associated content from the player.

8. The method of claim 1, wherein providing associated content by the content buffer includes providing the associated content following a request by the player for associated content and based on associated content stored by the content buffer.

9. The method of claim 1, further comprising clearing stored segments of content by the content buffer following distribution to the player.

10. The method of claim 1, further comprising creating a playlist by the content buffer based on the request, requesting content from the server based on the playlist and assembling requested content from the server for distribution to the player based on the playlist.

11. A device comprising:
 a memory; and
 a controller coupled to the memory, the configured to present a content player and run a content buffer to
  detect a request for network content from a player, wherein the request is a network communication detected by the content buffer and the request for network content is directed to a server, wherein the request includes a data range;
  create a playlist and virtual segments for the network content in response to the request;
  request a first virtual segment of the playlist for the network content from the server based on the data range;
  identify associated network content, wherein the associated network content is associated with the network content requested by the player;
  pre-download associated network content for the player based on the identifying, wherein the content buffer requests associated network content from the server based on a second virtual segment of the playlist for the associated network content; and
  provide the associated network content to the player.

12. The device of claim 11, wherein detecting a request for network content from the player includes intercepting network communications for streaming content generated by the server based on one or more of file type and file naming.

13. The device of claim 11, wherein the content buffer detects requests by intercepting communications relative to a shared network communication link.

14. The device of claim 11, wherein the content buffer detects requests based by intercepting communications relative to an input/output interface of a device executing the player.

15. The device of claim 11, wherein identifying includes associating the request with a pattern based on one or more of previous requests, file name extensions and identification of a playlist.

16. The device of claim 11, wherein identifying includes determining a byte range for content based on byte range identification in the request.

17. The device of claim 11, wherein pre-downloading includes requesting the associated content by the content buffer prior to the content buffer detecting a request for the associated content from the player.

18. The device of claim 11, wherein providing associated content by the content buffer includes providing the associated content following a request by the player for associated content and based on associated content stored by the content buffer.

19. The device of claim 11, further comprising clearing stored segments of content by the content buffer following distribution to the player.

20. The device of claim 11, further comprising creating a playlist by the content buffer based on the request, requesting content from the server based on the playlist and assembling requested content from the server for distribution to the player based on the playlist.

* * * * *